United States Patent
Chevillard et al.

(10) Patent No.: US 7,041,733 B2
(45) Date of Patent: *May 9, 2006

(54) CONTROLLING PARTICLE SIZE IN HIPS USING METAL CARBOXYLATES

(75) Inventors: Cyril Chevillard, Dickinson, TX (US); Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/691,827

(22) Filed: Oct. 23, 2003

(65) Prior Publication Data

US 2005/0090614 A1 Apr. 28, 2005

(51) Int. Cl.
C08F 279/02 (2006.01)
C08F 4/38 (2006.01)

(52) U.S. Cl. ............... 525/69; 525/263; 525/265; 525/241; 525/316; 525/245; 525/333.3; 526/230; 526/230.5; 526/232.5; 526/346

(58) Field of Classification Search ................ 525/69, 525/263, 265, 316, 241, 245, 333.3; 526/230, 526/230.5, 232.5, 346
See application file for complete search history.

(56) References Cited

U.S. PATENT DOCUMENTS 6,770,716 B1 * 8/2004 Sosa et al. ................. 525/316

* cited by examiner

*Primary Examiner*—James J. Seidleck
*Assistant Examiner*—Olga Asinovsky
(74) *Attorney, Agent, or Firm*—Madan, Mossman & Sriram; Tenley R. Krueger (57) ABSTRACT

It has been discovered that certain compounds serve as particle size regulators when employed together with peroxide initiators for the polymerization of vinylaromatic monomers in the presence of diene polymers. Suitable compounds that can control particle size include, but are not necessarily limited to, cobalt naphthenate, zinc naphthenate, iron octoate, calcium octoate, zinc octoate, zinc neodecanoate, potassium octoate, copper naphthenate, calcium versalate, and the like. Use of these metal carboxylates when vinylaromatic monomers are polymerized in the presence of polybutadienes and peroxide initiators results in reduced polybutadiene particles. Grafting and morphology characteristics may also be improved.

34 Claims, 6 Drawing Sheets

150 ppm Ca octoate – 200 ppm L331

150 ppm Ca octoate – 200 ppm L531

150 ppm Ca octoate – 200 ppm L331

150 ppm Ca octoate – 200 ppm L531

FIG. 6

150 ppm Zn naphthenate – 200 ppm L331

150 ppm Zn naphthenate – 200 ppm L531

150 ppm Zn naphthenate – 200 ppm L331

150 ppm Zn naphthenate – 200 ppm L531

CONTROLLING PARTICLE SIZE IN HIPS USING METAL CARBOXYLATES

FIELD OF THE INVENTION

The present invention is related to methods and compositions useful to improve the manufacture of high impact polystyrene and copolymers of styrene. It relates more particularly to methods of polymerizing and copolymerizing styrene monomer in the presence of elastomers and metal carboxylates in order to control rubber particle size

BACKGROUND OF THE INVENTION

High impact polystyrene (HIPS) is an example of graft polymer formation between polystyrene and polybutadiene. A wide variety of peroxy compounds is known from the literature as initiators for the production of styrenic polymers. Commercially available initiators for polymer production may be classified in different chemical groups, which include diacylperoxides, peroxydicarbonates, dialkylperoxides, peroxyesters, peroxyketals, and hydroperoxides. Peroxides and hydroperoxides undergo at least four reactions in the presence of monomers or hydrocarbons with double bonds. These reactions are: 1) chain transfer, 2) addition to monomer, 3) hydrogen abstraction, and 4) re-combination, often called a cage effect.

Hydroperoxides have been shown to undergo induced decomposition reactions, in which a polymer radical (~~P*) will react with the initiator as shown below. This reaction is basically a chain transfer reaction and the reaction should be amenable to the well-known chain transfer equations. Radicals obtained from peroxide initiators (RCOO*) can also abstract a hydrogen from the hydroperoxide.

Baysal and Tobolsky (*Journal of Polymer Science*, Vol. 8, p. 529 et seq., (1952), incorporated by reference herein) investigated the chain transfer of polystyryl radicals to t-butyl hydroperoxide (t-BHP), cumyl hydroperoxide (CHP), benzoyl peroxide ($Bz_2O_2$), and azobisisobutyronitrile (AIBN). AIBN and benzoyl peroxide give the classical linear correlations between rate and 1/DP (Degree of Polymerization) indicating no chain transfer to initiators. The hydroperoxides, however, show significant levels of chain transfer.

A. I. Lowell and J. R. Price (*Journal of Polymer Science*, Vol. 43, p. 1, et seq. (1960), incorporated by reference herein) also showed that polystyryl radicals undergo considerable chain transfer with bis(2,4-dichloro) benzoyl peroxide as compared to dilauroyl peroxide.

The transition metal catalyzed peroxidation of the pendant allylic functionality in ethylene-propylene-diene monomer (EPDM) rubbers with tertiary butyl hydroperoxide results in elastomeric, high polymer peroxides, according to B. Dean in "Graft Copolymers from Peroxidized EPDM Rubber," *Journal of Applied Polymer Science*, Vol. 32, pp. 5619–5625 (1986), incorporated by reference herein. The peroxidized EPDM rubbers are useful as free radical initiators for the polymerization and grafting of vinyl monomers in the preparation of comb-type structures. The grafted EPDM rubbers are efficient impact modifiers for thermoplastic resins so long as the polymer grafted onto the EPDM is identical to or is thermodynamically miscible with the composition of the thermoplastic resin.

Cobalt naphthenate and hydroperoxides of methyl ethyl ketone or other hydroperoxides are known to initiate styrene polymerizations at room temperature, and in fact, this reaction is used to form castings.

The ductile properties of HIPS are controlled primarily by the soft rubbery component. Much effort has been expended in developing methods to control the rubber particle size and the rubber morphology of the rubber phase, which is composed of polybutadiene (PB), trapped polystyrene (PS), and PS grafted on PB. The size of rubber particles in HIPS is determined by adjusting the bulk viscosity of the incompatible PS and PB phases, the shear rate, as well as the temperature and other factors. Rubber particle size can also be controlled by using additives, such as styrene-butadiene copolymers.

It would be desirable if methods could be devised or discovered to improve and control the properties of HIPS, including the resultant rubber particle size that occurs during this polymerization.

SUMMARY OF THE INVENTION

In one embodiment of the invention, there is provided a method for producing a polymerized product that involves polymerizing at least one vinylaromatic monomer in the presence of a peroxide initiator and at least one diene polymer and adding at least one metal carboxylate to the vinylaromatic monomer, where the metal in the metal carboxylate is selected from the group consisting of Groups IA, IIA, VIII, IB and IIB of the Periodic Table (CAS notation). A polymerized product is recovered. It is possible to change the size of the diene polymer (rubber) particles by selecting the type and amount of metal carboxylate. In particular, the size of the rubber particles may be reduced.

In another embodiment of the invention, there is provided a vinylaromatic/diene copolymer resin at includes at least one vinylaromatic monomer, at least one diene polymer, at least one peroxide initiator, and at least one metal carboxylate. Again, the metal in the metal carboxylate is selected from the group consisting of Groups IA, IIA, VIII, IB and IIB of the Periodic Table (CAS notation). The amount of metal carboxylate is effective to change the size of diene polymer particles in the resultant co-polymer as compared with an otherwise identical copolymer resin absent the metal carboxylate.

In another embodiment of the invention, there is provided an article made with the vinylaromatic/diene copolymer described above.

DETAILED DESCRIPTION OF THE INVENTION

It has been discovered that relatively low levels of metal carboxylates, such as calcium octoate, can reduce rubber particle size while improving the internal morphology of the particles. This method is thus a novel way of controlling rubber particle size in HIPS formulations. As will be seen, the main effect is to reduce the rubber particle size, but in some cases using some metal carboxylates it is possible to increase rubber particle size.

Cobalt and iron carboxylates, such as naphthenates have been used to promote the decomposition of hydroperoxides and thus initiate vinyl polymerizations at room temperature. Metal carboxylates are also used in the paint industry for improving pigment dispersion and for accelerating the curing process of the film surface. They are also used in the tire industry as crosslinking agents and steel-rubber adhesion promoters. However, it is believed that their use as soaps or surfactants to modify the particle size and/or morphology in HIPS formulations is novel.

The composition of the invention can comprise a polydiene-modified monovinyl aromatic polymer, and can comprise a rubber-modified polystyrene. Styrene monomer can be polymerized in the presence of from about 2 to about 15 weight percent rubber to produce a polymer having impact resistance superior to that of polystyrene homopolymer. A rubber that can be used in making the subject compositions is polybutadiene. The resultant thermoplastic composition, which can be made with these materials, is high impact polystyrene, or HIPS. The predominant morphology of the polymer made from embodiments of the invention is cell or "salami" with some core-shell, meaning that the continuous phase of polystyrene comprises a plurality of dispersed structures in which polystyrene is trapped within rubber particles having a distinct membrane and small quantities of polystyrene are occluded inside single cell polybutadiene shells grafted to the aromatic polymer.

Styrene polymerization processes are well known. The compositions of the invention can be made by batch polymerization in the presence of from about 2 to 15, and in some embodiments can be made from about 4 to about 12, weight percent polybutadiene using conventional initiators at concentrations of from about 100 to about 800 ppm and using a solvent. Hydroperoxide and peroxydicarbonate, peroxyesters, peroxyketals, dialkyl peroxides initiators useful in making the invention include peroxide initiators having a half-life of one hour at 110–190° C., including, but not necessarily limited to, 1,1-di-(t-butylperoxy)cyclohexane (Lupersol® 331 catalyst or L-331 available from ATOFINA Chemicals, Inc.); 1,1-di-(t-amylperoxy)cyclohexane (Lupersol® 531 catalyst or L-531 available from ATOFINA Chemicals, Inc.); ethyl-3,3-di(t-butylperoxy)butyrate (Lupersol® 233 catalyst or L-233 available from ATOFINA Chemicals, Inc.); t-amyl peroxy-2-ethylhexyl carbonate (TAEC), t-butylperoxy isopropyl carbonate (TBIC), t-butyl perbenzoate; 1,1-di-(t-butylperoxy)-3,3,5-trimethyl-cyclohexane (Lupersole® 231 catalyst or L-231 available from ATOFINA Chemicals, Inc.); ethyl-3,3-di(t-amylperoxy)butyrate (Lupersol 533), and di-isopropyl benzene monohydroperoxide (DIBMH).

Suitable solvents include, but are not necessarily limited to, ethylbenzene, xylenes, toluene, hexane and cyclohexane. Accelerators can be optionally used to accelerate the rate of polymerization as described in U.S. patent application Ser. No. 10/379,052 filed Mar. 4, 2003, incorporated by reference herein.

Grafting is also favored by using polybutadiene having a medium or high-cis isomer content. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C. to further concentrate the polybutadiene solution to about 24 to 26 weight percent, the approximate consistency of rubber cement. The crumb polybutadiene is then precipitated from the solution using steam, then dried and baled. Commercially available rubbers suitable for producing HIPS are available from several suppliers such as Bayer 380, 550, and 710 (Bayer Corporation, Orange, Tex.) and Firestone Diene 35, 55 and 70 (Firestone Polymers, Akron, Ohio), but of course are not limited to these.

In making the certain compositions of the invention, batch polymerizations can be conducted in 97:3 to 91:9 styrene to rubber ratio, 85:15 to 80:20 typical styrene solvent mixtures to 60–80% styrene conversion to polystyrene and then flashing off the unreacted monomer and the solvent. In a non-limiting, typical preparation, 3–12% of rubber is dissolved in styrene, then about 10% ethylbenzene is added as 90:10 styrene:ethylbenzene. The ethylbenzene diluent could include solvent, but have other components present as well. A possible temperature profile to be followed in producing the subject compositions is about 110° C. for about 120 minutes, about 130° C. for about 60 minutes, and about 150° C. for about 60 minutes. The polymer is then dried and devolatilized by conventional means. Although batch polymerizations are used to describe the invention, the reactions described can be carried out in continuous units, as the one described by Sosa and Nichols in U.S. Pat. No. 4,777,210, incorporated by reference herein.

As noted, it has been surprisingly discovered that metal carboxylates can control rubber particle size and morphology in HIPS. In one non-limiting embodiment of the invention, the metal in the metal carboxylate is selected from the group consisting of Groups IIA, VIII and IIB of the Periodic Table (CAS notation) and combinations thereof. In another non-limiting embodiment of the invention, the metal in the metal carboxylate is selected from the group consisting of calcium, iron, cobalt, zinc, copper and potassium and combinations thereof.

The carboxylic acid used to make the metal carboxylates useful in this invention include, but are not necessarily limited to, straight, branched, cyclic, or aromatic carboxylic acids having from about 2 to about 15 carbon atoms in one non-limiting embodiment, and from about 2 to about 10 carbon atoms in an alternate, non-limiting embodiment of the invention. In the context of this invention, the term metal carboxylates includes metal dicarboxylates.

Specific examples of suitable metal carboxylates include, but are not necessarily limited to, cobalt naphthenate, zinc naphthenate, iron octoate (or iron 2-ethyl-hexanoate), calcium octoate, calcium versalate, zinc octoate, zinc neodecanoate, potassium octoate, copper naphthenate and the like. It will be appreciated that more than one metal carboxylate may be used in some non-limiting embodiments of the invention.

In one non-limiting embodiment of the invention, the proportion of the metal carboxylate expected to be suitable or useful ranges from about 10 to about 900 ppm, based on the vinylaromatic monomer amount in one non-limiting embodiment, and ranges from about 150 to about 600 ppm in another non-limiting embodiment.

It has been discovered that transition metal accelerators, such as iron, cobalt, copper, can be used together with conventional peroxide initiators to accelerate the decomposition of the peroxides commonly used in the manufacture of polystyrene and HIPS. The accelerator may be added prior to, during or after the initiator is added to the monomer. The result of this accelerated peroxide decomposition is an increase in polymerization rate and/or an increase in grafting in HIPS copolymer.

The invention will now be described with respect to certain specific Examples, which are not intended to limit the invention, but simply to more fully illustrate it with respect to actual embodiments.

Figure 1:
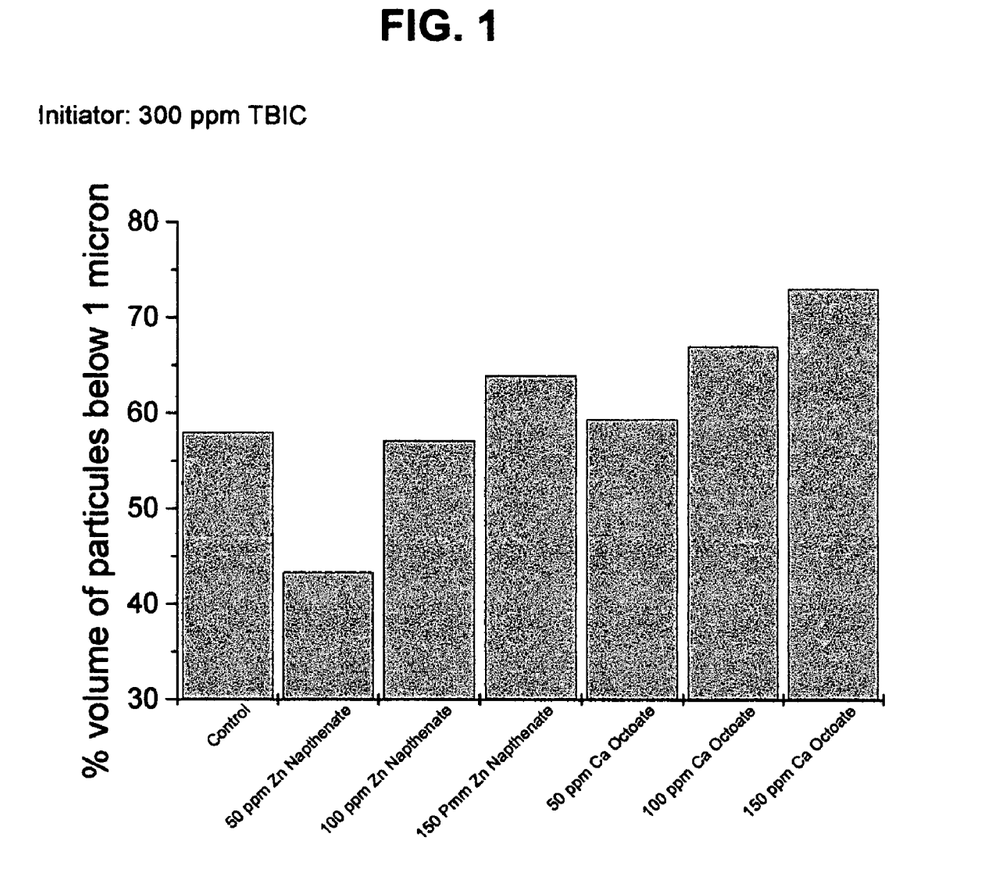
FIG. 1 is a graph of the volume % of particles below 1 micron as a function of the type and amount of metal carboxylate employed using 300 ppm of TBIC initiator.
Figure 2:
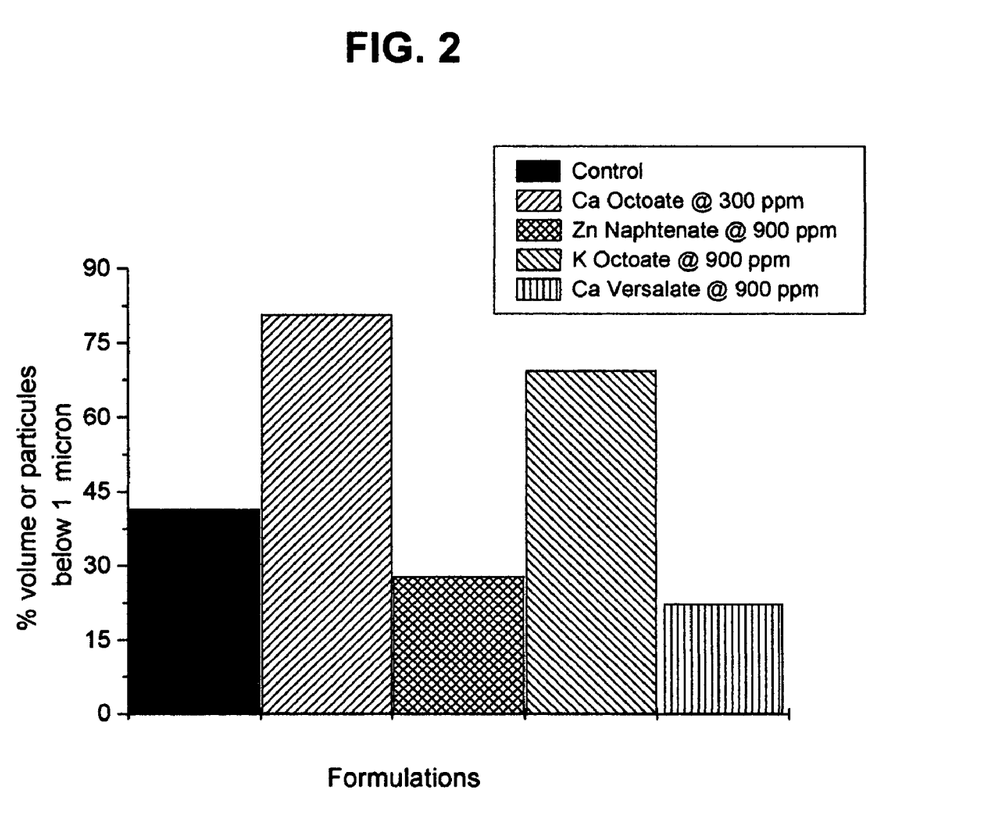
FIG. 2 is a graph of the volume % of particles below 1 micron as a function of the type and amount of metal carboxylate employed using 300 ppm of TBIC initiator.

Metal carboxylates presented in Table I were used in conjunction with L331 (1,1 di(tert-butylperoxy)cyclohexane), L531(1,1 di(tert-amylperoxy)cyclohexane), DIBMH (di-isopropylbenzene monohydroperoxide) and polymerizations were conducted from the same feed solution as described below.

particles below 1 micron. Calcium octoate gives reduced particle sizes for all proportions as seen in FIG. 1. In FIG. 2, both Ca octoate at 300 ppm and potassium octoate at 900 ppm give increased % volume of particles below 1 micron, where zinc naphthenate and calcium versalate gave reduced % volume of particles below 1 micron, as compared to the control.

Figure 3:
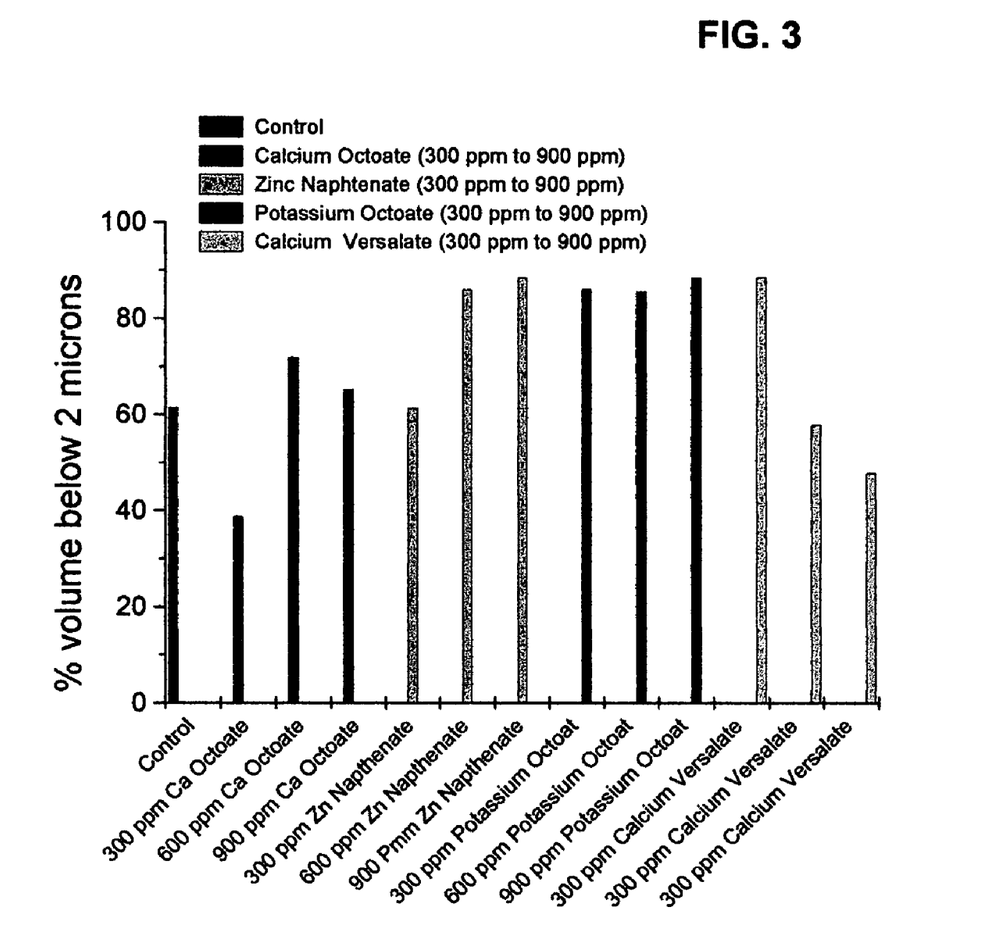
FIG. 3 is a graph of the volume % of particles below 2 microns as a function of the type and amount of metal carboxylate using 300 ppm of TBIC initiator

FIG. 3 shows the % volume of particles below 2 microns for four different metal carboxylates at three different proportion levels for each. It may be seen that the % volume for calcium octoate and zinc naphthenate appear to level off at about 600 ppm, whereas for potassium octoate the % volume is about the same for all dosage levels. However, in the case of calcium versalate, 300 ppm gives the greatest % volume below 2 microns.

Morphology

Transmission electron microscopy (TEM) is used to show the effect of calcium and zinc carboxylates on HIPS morphology. With this technique, the rubber phase appears black and the PS phase is white.

Figure 4:
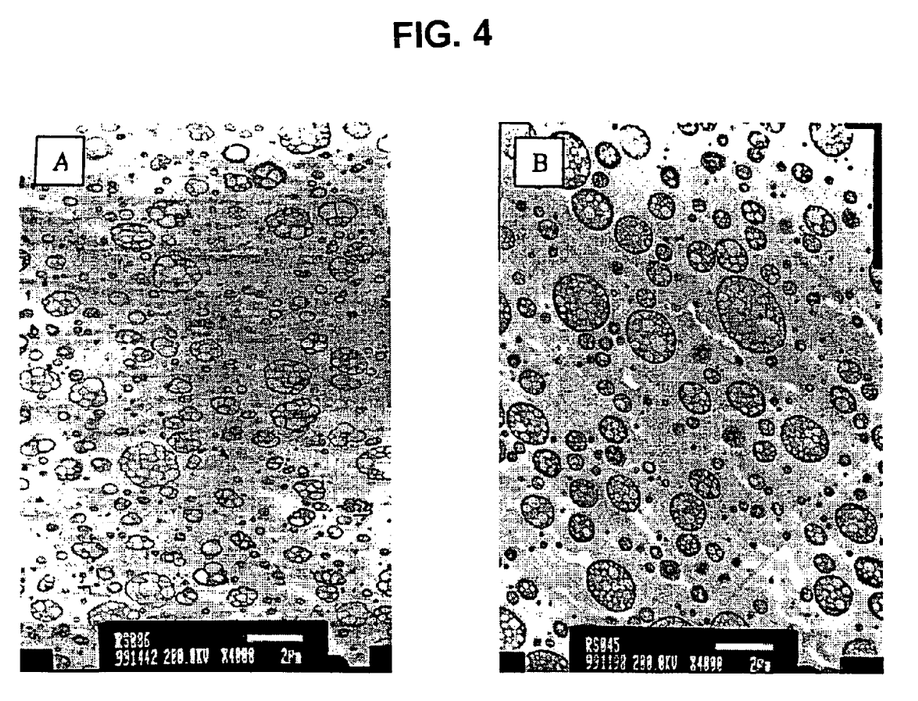
FIG. 4 is a comparison of TEM micrographs of laboratory batch polymerizations with 170 ppm L-233 (A) (1 hour half-life 134° C. (from ATOFINA CHEMICAL's catalog)) and 300 ppm of TAEC (B) (1 hour half-life 117° C.)

FIG. 4 is a comparison of TEM micrographs of laboratory batch polymerizations with 170 ppm L-233 (A) (1 hour half-life 127° C.) and 300 ppm of TAEC (B) (1 hour half-life 113° C.). FIG. 4 shows typical morphologies obtained

TABLE I

Metal Carboxylate Compounds Used

| | | Formulations | | | | | | | | | | | |
|---|---|---|---|---|---|---|---|---|---|---|---|---|---|
| | | #1 | #2 | #3 | #4 | #5 | #6 | #7 | #8 | #9 | #10 | #11 | #12 |
| zinc 2-ethylhexanoate (octoate) | Zn Oct | 150 | | | | | | 150 | | | | | |
| zinc naphthenate | Zn Na | | 150 | | | | | | 150 | | | | |
| zinc neodecanoate | Zn Neo | | | 150 | | | | | | 150 | | | |
| iron (III) 2-ethylhexanoate (octoate) | Fe Oct | | | | 150 | | | | | | 150 | | |
| calcium 2-ethylhexanoate (octoate) | Ca Oct | | | | | 150 | | | | | | 150 | |
| cobalt naphthenate | Co Na | | | | | | 150 | | | | | | 150 |
| Control | L331 | 200 | 200 | 200 | 200 | 200 | 200 | | | | | | |
| Control | L531 | | | | | | | 200 | 200 | 200 | 200 | 200 | 200 |

Comparison of Rubber Particle Size (RPS) of HIPS with Different Metal Carboxylates Using Two Initiators When metal carboxylates are used with L531, rubber particle size (RPS) is as follows:
  Barely changes with Co Na (#12)
  Lowered with Zn Na, Fe Oct, Zn Oct and Zn neo (#8, #10, #7, #9, respectively)
  Minimum with Ca Oct (#11)

When metal carboxylates are used with L331, RPS is as follows:
  Barely changed with Co Na (#6)
  Lowered with Zn Na, Zn Oct and Zn neo (#2, #1, #3, respectively)
  Minimum with Ca Oct and Fe Oct (#5, #4, respectively)

The results of other Examples showing the effects of various proportions on RPS are summarized in FIGS. 1 and 2. It may be seen from these charts that the metal carboxylates of this invention affect or control, by enlarging or reducing the diene polymer particle size of these copolymers, as compared to the control Examples. For instance, in FIG. 1 zinc naphthenate at 50 ppm gives a % volume of particles below 1 micron that is less than the control, whereas 100 ppm Zn naphthenate gives about the same result, whereas 150 ppm gives a greater % volume of rubber without the use of metal carboxylates. The use of different initiators can affect the size of the PS trapped inside the particles (occlusions). The morphology obtained with TAEC is more desirable (more like a honeycomb), since the membranes of the particles are thinner and the occlusions are larger. This leads to higher rubber utilization. Another important fact is that the rubber particle size (RPS) distribution and the morphology of the particles. Small particles that have one occlusion and a thin outer rubber membrane have core-shell morphologies.

Figure 5:
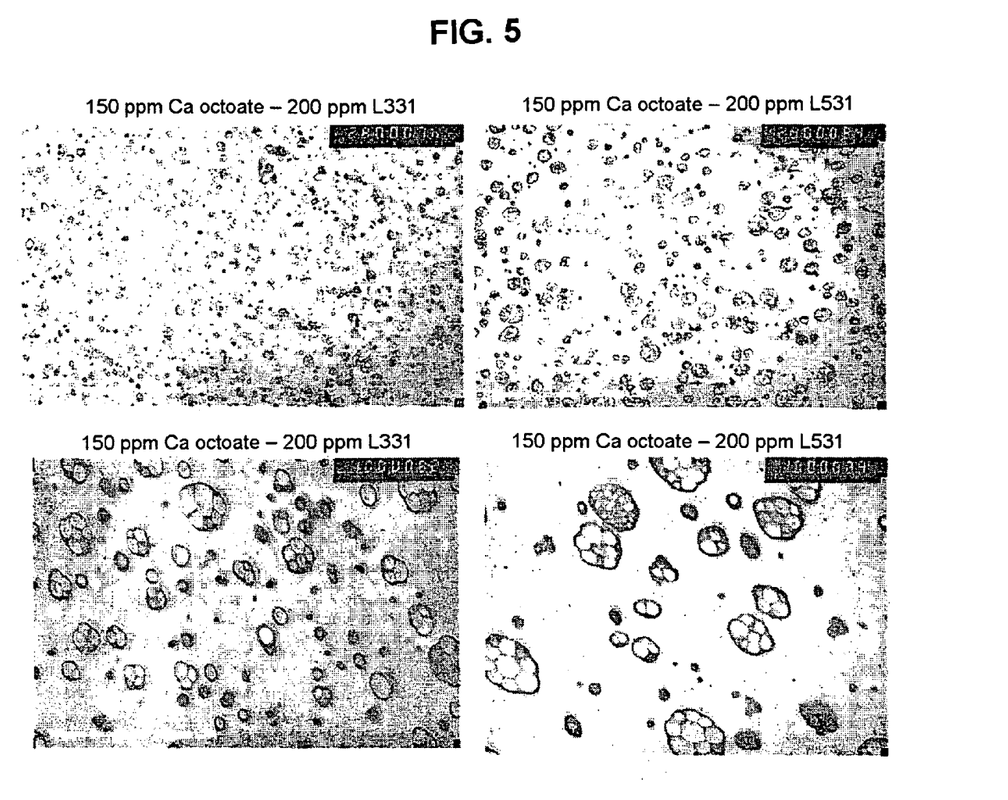
FIG. 5 shows TEM pictures of morphologies obtained using L-531 and L-331 with calcium octoate.
Figure 6:
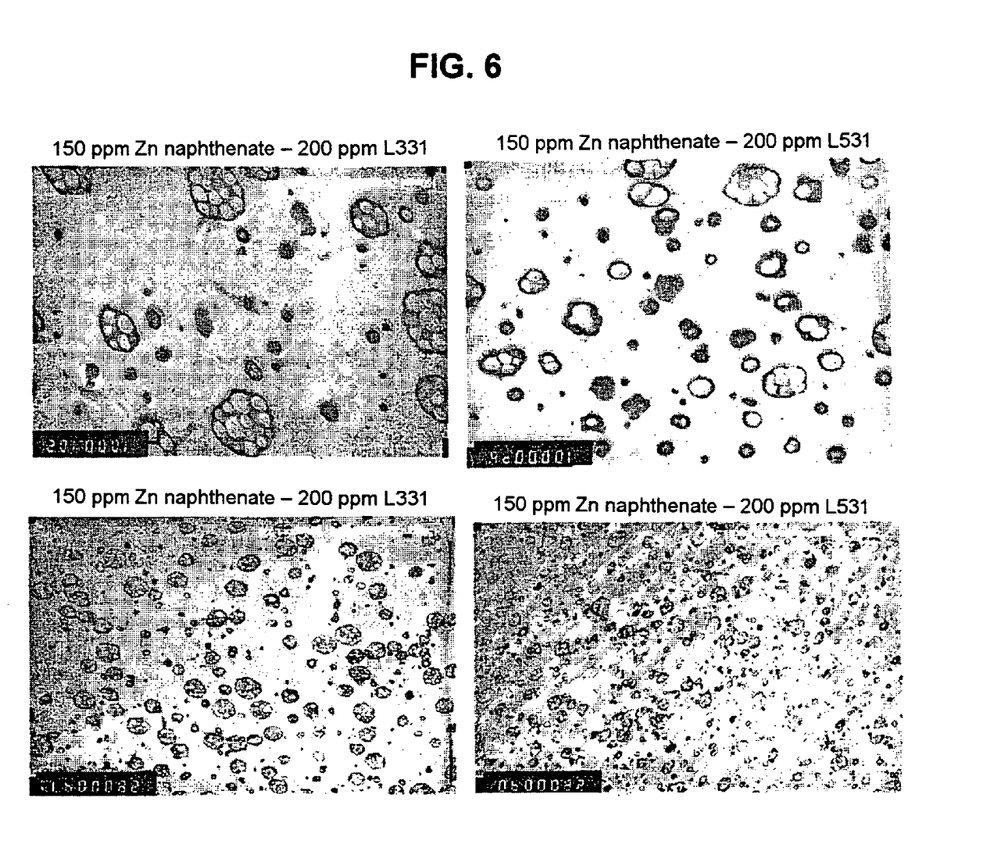
FIG. 6 shows TEM pictures of morphologies obtained using L-531 and L-331 with zinc naphthenate.

FIG. 5 shows TEM pictures of morphologies obtained using L-531 and L-331 with calcium octoate. FIG. 6 shows TEM pictures of morphologies obtained using L-531 and L-331 with zinc naphthenate. It may be seen that a larger amount of core-shell structures is formed with L-331 and calcium octoate. Honeycomb structures with larger occlusions were found when calcium was mixed with L-531 and zinc naphthenate is mixed with L-531 and L-331.

The current data shows that calcium octoate produces small rubber partides and yet produces excellent honeycomb morphologies, thus the technique of the invention could be used to modify RPS while producing morphologies with more core shell. This invention could lead to better control of gloss and ductility properties of HIPS.

Rubber Chemistry Data for Metal Carboxylates with TBIC

HIPS and PS were synthesized in batch reactors and a Couette cell using mixtures of metal carboxylates (cobalt, iron, zinc and calcium) and organic peroxides with a 1-hour half-life that ranged from 110° C. to 120° C. (LUPERSOL L-331, LUPERSOL L-531, TAEC and TBIC). It was found that the addition of cobalt and iron carboxylates promoted H-abstraction to the rubber (% grafting increases); slightly lowering the rate of polymerization and Mn, suggesting that these transition metals could act as scavengers for peroxyketals. Experiments carried out in a Couette cell indicate the possibility of shifting the inversion point.

It was further found that the addition of zinc, calcium and potassium carboxylates, lowered the viscosity and rubber particle size distribution. Further, when used in the range of 300 to 900 ppm, the gel/rubber ratio slightly increases to reach a value of 3.81 instead of 3.59 as seen in Table II. Experiments carried out in a Couette cell indicate the possibility of shifting the inversion point.

TABLE II

Rubber Chemistry Data of Mixtures of Calcium Octoate, Calcium Versalate and Zinc Naphthenate with 300 ppm of TBIC and 4% Bayer 380

| Sample # | Tube # | % Gels | Swell Index | Product % Rubber | Gel/Rubber | % Grafting |
|---|---|---|---|---|---|---|
| control | 1 | 17.6 | 11.1 | 4.90 | 3.59 | 259 |
| 300 Ca Oct | 2 | 17.4 | 10.6 | 4.88 | 3.57 | 257 |
| 600 Ca Oct | 3 | 18.5 | 9.4 | 5.02 | 3.68 | 268 |
| 900 Ca Oct | 4 | 17.1 | 11.9 | 4.95 | 3.44 | 244 |
| 300 Ca versalate | 5 | 18.8 | 8.4 | 4.94 | 3.81 | 281 |
| 600 Ca versalate | 6 | 15.1 | 14.5 | 4.91 | 3.08 | 208 |
| 900 Ca versalate | 1 | 17.2 | 11.1 | 5.04 | 3.41 | 241 |
| 300 K Oct | 2 | 15.9 | 11.8 | 4.85 | 3.27 | 227 |
| 600 K Oct | 3 | 16.7 | 12.2 | 5.14 | 3.24 | 224 |
| 900 K Oct | 4 | 15.7 | 12.9 | 4.94 | 3.19 | 219 |

In the foregoing specification, the invention has been described with reference to specific embodiments thereof, and has been demonstrated as effective in providing methods for preparing polymers with reduced rubber particle size and/or improved morphologies using metal carboxylate additives. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinylaromatic monomers, diene co-monomers, peroxide initiators, metal carboxylates, and other components (e.g. accelerators) falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

We claim:

1. A method for producing a polymerized product comprising:
   polymerizing at least one vinylaromatic monomer in the presence of a peroxide initiator and at least one diene polymer;
   adding at least one metal carboxylate to the vinylaromatic monomer, where the metal in the metal carboxylate is selected from the group consisting of Groups IA and IIA, of the Periodic Table (CAS notation); and
   recovering a polymerized product.

2. The method of claim 1 where the metal carboxylate is added in an amount effective to change the size of diene polymer particles in the resultant co-polymer as compared wit an otherwise identical method absent the metal carboxylate.

3. The method of claim 1 where the amount of metal carboxylate added is effective to reduce the size of diene polymer particles in the resultant co-polymer as compared with an otherwise identical method absent the metal carboxylate.

4. The method of claim 1 where the metal in the metal carboxylate is selected from the group consisting of calcium, potassium, and combinations thereof.

5. The method of claim 1 where the ligand of the metal carboxylate is selected from the group consisting of naphthenates, neodecanoates, versalates, and octoates of calcium, potassium, and combinations thereof.

6. The method of claim 1 where the carboxylate moiety of the metal carboxylate is derived from a carboxylic acid selected from the group consisting of straight, branched, cyclic and aromatic carboxylic acids having from 2 to 15 carbon atoms.

7. The method of claim 1 where the metal carboxylate is added in an amount ranging from about 10 to about 900 ppm, based on the vinylaromatic monomer.

8. The method of claim 1 where the peroxide initiator is selected from the group consisting of 1,1-di-(t-butylperoxy) cyclohexane, 1,1-di-(t-amylperoxy)cyclohexane, t-amyl peroxy-2-ethylhexyl carbonate (TAEC), t-butylperoxy isopropyl carbonate (TBIC), ethyl-3,3-di(t-butylperoxy)butyrate, t-butyl perbenzoate, 1,1-di-(t-butylperoxy)-3,3,5-trimethyl-cyclohexane, ethyl-3,3-di(t-amylperoxy)butyrate, and di-isopropyl benzene monohydroperoxide (DIBMH) and mixtures thereof.

9. The method of claim 1 where polymerizing the monomer is conducted at a temperature between about 110° C. and about 170° C.

10. The method of claim 1 where the weight ratio of vinylaromatic monomer to diene polymer is from about 97:3 to about 85:15.

11. The method of claim 1 where in the polymerized product recovered is high impact polystyrene (HIPS).

12. A method for producing a polymerized product comprising:
   polymerizing at least one vinylaromatic monomer in the presence of a peroxide initiator and at least one diene polymer;
   adding at least one metal carboxylate to the vinylaromatic monomer, where the metal in the metal carboxylate is selected from the group consisting of calcium, potassium and combinations thereof where the amount of metal carboxylate is effective to change the size of diene polymer particles in the resultant co-polymer as compared with an otherwise identical method absent the metal carboxylate); and recovering a polymerized product.

13. The method of claim 12 where the amount of metal carboxylate added is effective to reduce the size of diene polymer particles in the resultant co-polymer as compared with an otherwise identical method absent the metal carboxylate.

14. The method of claim 12 where ligand of the metal carboxylate is selected from the group consisting of naphthenates, neodecanoates, versalates, octoates, and combinations thereof.

15. The method of claim 12 where the metal carboxylate is added in an amount ranging from about 10 to about 900 ppm, based on the vinylaromatic monomer.

16. The method of claim 12 where in polymerizing the monomer, the peroxide initiator is selected from the group consisting of 1,1-di-(t-butylperoxy)cyclohexane, 1,1-di-(t-amylperoxy)cyclohexane, t-amyl peroxy-2-ethylhexyl carbonate (TAEC), t-butylperoxy isopropyl carbonate (TBIC), ethyl-3,3-di(t-butylperoxy)butyrate, t-butyl perbenzoate, 1,1-di-(t-butylperoxy)-3,3,5-trimethyl-cyclohexane, ethyl-3,3-di(t-amylperoxy)butyrate, di-isopropyl benzene monohydroperoxide (DIBMH) and mixtures thereof.

17. The method of claim 12 where in polymerizing the monomer is conducted at a temperature between about 110° C. and about 170° C.

18. The method of claim 12 where the weight ratio of vinylaromatic monomer to diene polymer is from about 97:3 to about 85:15.

19. A vinylaromatic/diene copolymer resin formulation comprising at least one vinylaromatic monomer, at least one diene polymer, at least one peroxide initiator, and at least one metal carboxylate, where the metal in the metal carboxylate is selected from the group consisting of Groups IA and IIA, of the Periodic Table (CAS notation), and where the amount of metal carboxylate is effective to change the size of diene polymer particles in the resultant co-polymer as compared with an otherwise identical copolymer resin absent the metal carboxylate.

20. The vinylaromatic/diene copolymer resin formulation of claim 19 where the metal in the metal carboxylate is selected from the group consisting of calcium, potassium and combinations thereof.

21. The vinylaromatic/diene copolymer resin formulation of claim 19 where the ligand of the metal carboxylate is selected from the group consisting of naphthenates, neodecanoates, versalates, octoates and combinations thereof.

22. The vinylaromatic/diene copolymer resin formulation of claim 19 where the carboxylate moiety of the metal carboxylate is derived from a carboxylic acid selected from the group consisting of straight, branched, cyclic and aromatic carboxylic acids having from 2 to 15 carbon atoms.

23. The vinylaromatic/diene copolymer resin formulation of claim 19 where the metal carboxylate is added in an amount ranging from about 10 to about 900 ppm, based on the vinylaromatic monomer.

24. The vinylaromatic/diene copolymer resin formulation of claim 19 where the peroxide initiator is selected from the group consisting of 1,1-di-(t-butylperoxy)cyclohexane, 1,1-di-(t-amylperoxy)cyclohexane, t-amyl peroxy-2-ethylhexyl carbonate (TAEC), t-butylperoxy isopropyl carbonate (TBIC), ethyl-3,3-di(t-butylperoxy)butyrate, t-butyl perbenzoate, 1,1-di-(t-butylperoxy)-3,3,5-trimethyl-cyclohexane, ethyl-3,3-di(t-amylperoxy)butyrate, di-isopropyl benzene monohydroperoxide (DIBMH) and mixtures thereof.

25. The vinylaromatic/diene copolymer resin formulation of claim 19 where the weight ratio of vinylaromatic monomer to diene polymer is from about 97:3 to about 85:15.

26. The vinylaromatic/diene copolymer resin formulation of claim 19 where the vinylaromatic/diene copolymer is high impact polystyrene (HIPS).

27. An article made with the vinylaromatic/diene copolymer resin formulation of claim 19.

28. A vinylaromatic/diene copolymer resin formulation comprising at least one vinylaromatic monomer, at least one diene polymer, at least one peroxide initiator, and at least one metal carboxylate, where the metal in the metal carboxylate is selected from the group consisting of calcium, potassium and combinations thereof, and where the amount of metal carboxylate is effective to reduce the size of diene polymer particles in the resultant co-polymer as compared with an otherwise identical copolymer resin absent the metal carboxylate.

29. The vinylaromatic/diene copolymer resin formulation of claim 28 where the ligand of the metal carboxylate is selected from the group consisting of naphthenates, neodecanoates, versalates, octoates and combinations thereof.

30. The vinylaromatic/diene copolymer resin formulation of claim 28 where the metal carboxylate is added in an amount ranging from about 10 to about 900 ppm, based on the vinylaromatic monomer.

31. The vinylaromatic/diene copolymer resin formulation of claim 28 where the peroxide initiator is selected from the group consisting of 1,1-di-(t-butylperoxy)cyclohexane; 1,1-di-(t-amylperoxy)cyclohexane; t-amyl peroxy-2-ethylhexyl carbonate (TAEC), t-butylperoxy isopropyl carbonate (TBIC), ethyl-3,3-di(t-butylperoxy)butyrate; t-butyl perbenzoate; 1,1-di-(t-butylperoxy)-3,3,5-trimethyl-cyclohexane; ethyl-3,3-di(t-amylperoxy)butyrate; di-isopropyl benzene monohydroperoxide (DIBMH) and mixtures thereof.

32. The vinylaromatic/diene copolymer resin formulation of claim 28 where the weight ratio of vinylaromatic monomer to diene polymer is from about 97:3 to about 85:15.

33. The vinylaromatic/diene copolymer resin formulation of claim 28 where the vinylaromatic/diene copolymer is high impact polystyrene (HIPS).

34. An article made with the vinylaromatic/diene copolymer resin formulation of claim 28.

* * * * *